United States Patent [19]

Carnahan et al.

[11] 4,175,152
[45] Nov. 20, 1979

[54] POLYMERIC MATERIALS CONTAINING SEMICONDUCTING REFRACTORY OXIDES

[75] Inventors: Robert D. Carnahan, Barrington, Ill.; William C. Holt, Jr., Alexandria, Va.; Karl J. Youtsey, Decatur, Ala.

[73] Assignee: UOP Inc., Des Plaines, Ill.

[21] Appl. No.: 887,688

[22] Filed: Mar. 17, 1978

Related U.S. Application Data

[60] Division of Ser. No. 670,014, Mar. 24, 1976, Pat. No. 4,107,092, which is a continuation-in-part of Ser. No. 335,972, Feb. 26, 1973, abandoned.

[51] Int. Cl.$^2$ ............................................. H01B 1/06
[52] U.S. Cl. .................... 428/242; 428/244; 428/241; 428/281; 428/323; 428/329; 428/331
[58] Field of Search ............... 252/511, 518; 428/403, 428/329, 331, 323, 281, 242, 244

[56] References Cited
U.S. PATENT DOCUMENTS

| | | | |
|---|---|---|---|
| 3,940,509 | 2/1976 | Youtsey et al. | 252/500 X |
| 3,992,212 | 11/1976 | Youtsey et al. | 252/511 X |

*Primary Examiner*—Richard E. Schafer
*Assistant Examiner*—E. Suzanne Parr
*Attorney, Agent, or Firm*—James R. Hoatson, Jr.; Raymond H. Nelson; William H. Page, II

[57] ABSTRACT

Novel compositions of matter comprise polymeric materials containing, as a filler therefor, a semiconducting pyropolymeric inorganic refractory oxide material, said compositions being useful in situations which require items such as electrically conductive sheets which possess a given electrical resistance.

7 Claims, No Drawings

POLYMERIC MATERIALS CONTAINING SEMICONDUCTING REFRACTORY OXIDES

CROSS-REFERENCE TO RELATED APPLICATION

This application is a division of our copending application Ser. No. 670,014, filed Mar. 24, 1976 now U.S. Pat. No. 4,107,092, which is a continuation-in-part of our copending application Ser. No. 335,972, filed Feb. 26, 1973, now abandoned all teachings of which are incorporated herein by reference thereto.

BACKGROUND OF THE INVENTION

Heretofore, most fillers for polymeric materials such as metals, graphite powders or carbon blacks possessed a fixed bulk resistivity so that any variations which are required in the electrical properties of the final composition of matter are, of necessity, obtained by varying the concentration of the particular filler which is employed. Thus, when a filler material with a fixed bulk resistivity, such as metal or carbon powder is used, it is difficult to control the desired final resistance if said resistance is in the region of rapidly changing resistance with changing concentration. The electrical resistivity of the final composition of matter for a given filler material will depend on filler concentration inasmuch as at lower filler concentration addition of filler material has very little effect on the resistance of the final composition of matter due to the tendency of polymeric materials to encapsulate the filler, while at higher filler concentrations addition of filler material causes very little change in the filler electrical properties, as is the case at lower filler concentrations, because of effective control of these properties by the bulk resistivity of the filler material. However, at intermediate filler concentrations, addition of filler material causes a rapid change in the final electrical properties because of the onset of filler particle-particle interactions in the polymeric matrix. Heretofore, the control of the electrical properties of the final composition of matter by varying the concentration of filler was a difficult procedure, especially, as hereinbefore set forth, if the final desired resistance was in the region of rapidly changing resistance. The optimum concentration is one in which small changes in filler concentration produce little or no change in resistance of the final product, this usually being achieved at high concentration of filler content. As will hereinafter be set forth in greater detail, by utilizing certain materials as fillers for polymeric materials, it will be possible to obtain final compositions of matter which possess desirable and controlled resistivity.

The prior art has disclosed the use of certain compounds which possess resistive properties. For example, U.S. Pat. No. 2,096,992 discloses the calcination of a combination of tannic acid with a gel-forming combination of materials. The description which is set forth in this patent is that of a finely divided carbon which is uniformly dispersed in a matrix. However, there is no description of the treatment conditions nor is there any description of the finished properties of the product and there is certainly no indication that a product can be produced which possesses variable electrical resistivity. The persistent reference which is made in this patent to carbon suggests that a very high calcination treatment temperature is used, that is, greater than about 1200° C., so that a material approaching graphite in nature is formed. There is nothing in this reference which teaches or suggests the novel composition of matter which is formed by the process of the present invention. Likewise, U.S. Pat. No. 3,576,378 teaches the use of a polymeric material having electrically conductive particles dispersed throughout the polymer. However, this electrically conductive material or conducting powders which are incorporated into the polymeric matrix have a continuous outer surface of metal, examples of the metals which are used to coat any known metal particles including aluminum, nickel, lead, zinc, cadmium, copper, iron, silver or gold. These electrically conductive particles are in no way similar to the carbonaceous pyropolymer composited on a refractory inorganic oxide which comprises the conductive particles of the present invention. Another reference which pertains to electroconductive compositions is U.S. Pat. No. 3,563,916 which utilizes a carrier such as a thermosetting resin containing carbon black. In a similar vein, U.S. Pat. No. 3,836,482 also shows a semiconducting composition containing, as a conductive material therefor, carbon black.

As hereinbefore set forth, the prior art fillers such as graphite metals or carbon black have a fixed bulk resistivity so that variations in the electrical properties of final product are obtained only by varying the concentration of the filler employed. The fixed bulk resistivity of carbon blacks is illustrated by reference to publications such as advertising brochures from the Cabot Corporation which lists typical properties of Cabot Formation Process Carbon Blacks which are used for inks, paints, plastics, and papers, the carbon blacks which are listed in various forms do not offer any quantitative data but only list the electrical resistivity as being high, medium or low. Thus, the variations in electrical properties must be dependent upon variations in the filler concentration. As will hereinafter be set forth in greater detail, in contradistinction to the fixed bulk resistivities of the carbon blacks, graphite powders, metals, etc., of the prior art, it will be shown that the bulk resistivity of the particular filler which is employed by the process of the present invention is variable over a wide range. As a result of this, the electrical properties of the final product may be controlled by varying the bulk resistivity of the filler rather than the volume concentration of the filler in the polymeric material, the latter method being the method which must be employed when using the semiconducting material of the prior art. Therefore, it is possible that the optimum filler concentration can be used so that the resistance of the final product is relatively insensitive to variations in the filler concentration as might be obtained in a production process and the resistance of the final product can therefore be precisely controlled by varying the bulk resistivity of the claimed filler.

As will also be hereinafter set forth in greater detail, it will be shown that there are additional inherent advantages to be derived from the use of the semiconducting pyropolymeric inorganic refractory oxide material as the filler in polymeric materials, these advantages resulting from the electrical characteristics of the filler. Among these inherent advantages are (1) controllable resistance change with temperature; (2) low current noise in applications which require quiet contacts to be attached to the final product; (3) excellent resistance stability with respect to temperature cycling; and (4) a high degree of batch to batch reproducibility of the electrical properties of the filler, the latter being in contradistinction to the situations with graphite or carbon where significant variations in reproducibility occur.

This invention relates to novel compositions of matter. More specifically, the invention relates to novel compositions of matter comprising polymeric materials which contain certain semiconducting pyropolymeric inorganic refractory oxide materials as fillers therefor, the final product being useful in the electrical field.

The use of polymeric materials which contain, as fillers therefor, other materials which possess electrical resistance properties are useful in many fields. For example, a polymeric material containing such a filler may be used where controllable resistance changes with temperature are required, as articles or products which possess low current noise, in applications which require quiet contacts to be attached to the final product and in other instances where an excellent resistance stability with respect to temperature cycling is required. By utilizing semiconducting pyropolymeric inorganic refractory oxide materials which possess certain electrical resistances, it is possible to prepare articles of manufacture which may possess conducting properties or which may possess anti-static properties. For example, it can be seen that an anti-static formulation would be extremely suitable in instances in which it is desirable to eliminate electric charges which may be built up by friction such as in synthetic fabrics which become charged by rubbing against another material as in automobile, bus, truck or airplane upholstery. In addition, it may also be most desirable for use in polymeric materials which are utilized in explosive environments such as fuel containers in airplanes, boats, automobiles, trucks, buses, etc., in fuel transfer pipelines such as those which are used to transport gasoline, oil or liquefied petroleum gas, heating gas, etc., in medical operating room surfaces where oxygen may be present with the possibility of sparking taking place, etc.

While the aforementioned discussion of the uses of polymeric materials containing a filler in anti-static situations where the filler possesses an electrical resistance between 50,000 and $10^{10}$ ohms, it is also possible to formulate compositions of matter comprising polymeric materials containing a filler which possess an electrical resistance less than 50,000 ohms, said compositions of matter being used where it is desirable to pass an electrical current through the item. These conducting layers of polymeric materials may be included in wall paneling or ceiling paneling in building construction for heating purposes or may also be used in exterior surfaces whereby de-icing of these surfaces could be accomplished in winter.

It is therefore an object of this invention to provide novel compositions of matter which possess desirable electrical properties.

Another object of this invention is to provide novel compositions of matter which may be used in either conducting or anti-static applications.

In one aspect an embodiment of this invention resides in a composition of matter comprising a polymeric material containing, as a filler therefor, a refractory inorganic oxide having a carbonaceous pyropolymer composited on the surface thereof.

Another embodiment of this invention resides in an electrically conductive sheet which comprises at least one layer of a reinforcing material provided with a polymeric matrix material containing a finely divided semiconductive filler comprising a refractory inorganic oxide having a carbonaceous pyropolymer composited on the surface thereof.

A specific embodiment of this invention resides in a novel composition of matter comprising polypropylene containing, as a filler therefor, a semiconducting pyropolymeric inorganic refractory oxide material possessing a particle size in the range of from about 0.1 microns to about 100 microns which has a bulk resistivity in the range of from about 0.001 ohm-centimeters up to about $10^{10}$ ohm-centimeters, said filler being present in a range of from about 10 to about 95% by weight of the composition.

Another specific embodiment of this invention is found in an electrically conductive sheet which comprises at least one layer of canvas provided with a polymeric matrix material comprising epoxy resin containing a finely divided semiconductive material comprising a refractory inorganic oxide having a carbonaceous pyropolymer composited on the surface thereof.

Other objects and embodiments will be found in the following further detailed description of the present invention.

As hereinbefore set forth the present invention is concerned with novel compositions of matter comprising polymeric materials containing, as a filler therefor, a semiconducting pyropolymeric inorganic refractory oxide material which possesses certain electrical properties including a resistivity of a certain magnitude. The semiconducting pyropolymeric inorganic refractory oxide material comprises a carbonaceous pyropolymer consisting of carbon and hydrogen on a high surface area inorganic oxide support. The magnitude of the resistivity can be varied and may range from about 0.001 up to about $10^{10}$ ohm-centimeters, the particular variation in resistivity being accomplished by varying the procedure in which the semiconducting pyropolymeric inorganic refractory oxide material is prepared. By utilizing this material as a filler for polymeric materials, it is possible to obtain articles which will overcome certain deficiencies which are possessed by articles such as those set forth in the prior art patents which have heretofore been discussed. Among the advantages which are possessed by the semiconducting pyropolymeric inorganic refractory oxide material of the instant application is that the temperature coefficient of resistance of these pyropolymeric materials is controllable over a relatively broad range; that the materials possess a low current noise index variance; that the resistance stability of the semiconducting pyropolymeric inorganic refractory oxide material with respect to temperature cycling can also be controlled to within a relatively narrow range and that the material of the present invention can also be prepared with an excellent batch to batch reproducibility.

The semiconducting pyropolymeric inorganic refractory oxide material which is utilized as a filler for the polymeric material of a type hereinafter set forth in greater detail may be prepared by heating an organic compound in the absence of oxygen and passing the pyrolyzable substance over the refractory oxide material in the vapor phase to form a carbonaceous pyropolymer thereon. The refractory oxide material which may be used as the base may be in any form such as loose or compacted dry powders, cast or calcined sols, heated sols, substrates in the form of flats, cylinders, and spheres, rods, pellets, etc. In the preferred embodiment of the present invention the refractory oxide base will be characterized as having a surface area of from 1 to about 500 square meters per gram. Illustrative examples of the refractory oxides which may be used will include alumina in various forms such as gamma-alumina and silica-alumina. In addition, it is also contemplated that the refractory oxide may be preimpregnated with a catalytic metallic substance such as platinum, platinum and rhenium, platinum and germanium, platinum and tin, platinum and lead, nickel and rhenium, tin, lead, germanium, etc.

Examples of organic substances which may be pyrolyzed to form the carbonaceous pyropolymer on the surface of the aforementioned refractory oxides will include aliphatic hydrocarbons, cycloaliphatic hydrocarbons, aromatic hydrocarbons, aliphatic halogen derivatives, aliphatic oxygen derivatives, aliphatic sulfur derivatives, aliphatic nitrogen derivatives, heterocyclic compounds, organometallic compounds, carbohydrates, etc. Some specific examples of these organic compounds which may be pyrolyzed will include ethane, propane, butane, pentane, ethylene, propylene, 1-butene, 2-butene, 1-pentene, 2-pentene, 1,3-butadiene, isoprene, cyclopentane, cyclohexane, methylcyclopentane, benzene, toluene, the isomeric xylenes, naphthalene, anthracene, chloromethane, bromomethane, chloroethane, bromoethane, chloropropane, bromopropane, isopropane, chlorobutane, bromobutane, isobutane, carbon tetrachloride, chloroform, 1,2-dichloroethane, 1,2-dichloropropane, 1,2-dichlorobutane, ethyl alcohol, n-propyl alcohol, isopropyl alcohol, n-butyl alcohol, sec-butyl alcohol, t-butyl alcohol, glycol, glycerol, ethyl ether, isopropyl ether, butyl ether, ethyl mercaptan, n-propyl mercaptan, butyl mercaptan, methyl sulfide, ethyl sulfide, ethyl methyl sulfide, methyl propyl sulfide, dimethyl amine, diethyl amine, ethyl methyl amine, acetamide, propionamide, nitroethane, 1-nitropropane, 1-nitrobutane, acetonitrile, propionitrile, formic acid, acetic acid, oxalic acid, acrylic acid, formaldehyde, acid aldehyde, propionaldehyde, acetone, methyl ethyl ketone, methyl propyl ketone, ethyl propyl ketone, methyl formate, ethyl formate, ethyl acetate, benzyl chloride, phenol, o-cresol, benzyl alcohol, hydroquinone, resorcinol, catechol, anisole, phenetole, benzaldehyde, acetophenone, benzophenone, benzoquinone, benzoic acid, phenyl acetate acid, hydrocynamic acid, furan, furfural, pyran, coumarin, indole, dextrose, sucrose, starch, etc. It is to be understood that the aforementioned compounds are only representative of of the class of compounds which may undergo pyropolymerization and that the present invention is not necessarily limited thereto.

As hereinbefore set forth the aforementioned organic compounds are admixed with a carrier gas such as nitrogen or hydrogen, heated and passed over the refractory oxide base. The deposition of the pyropolymer on the surface of the base is effected at relatively high temperatures ranging from about 400° to about 800° C. and preferably in a range of from about 600° to about 750° C. It is possible to govern the electrical properties of the semiconducting pyropolymeric inorganic refractory oxide material by regulating the temperature and the residence time during which the refractory oxide base is subjected to the treatment with the organic pyrolyzable substance. The thus prepared semiconducting pyropolymeric inorganic refractory oxide material when recovered will possess a resistivity in the range of from about $10^{-2}$ to about $10^8$ ohm-centimeters. However, if so desired, the semiconducting pyropolymeric inorganic refractory oxide material may also be subjected to additional exposure to elevated temperatures ranging from about 500° to about 1200° C. in an inert atmosphere and in the absence of additional pyrolyzable materials for various periods of time, said treatment resulting in the reduction of the electrical resistivity of the lowest resistivity powders by as much as six orders of magnitude. Another method of preparing the desired material is by impregnating the inorganic refractory oxide material with an aqueous solution of a carbohydrate such as dextrose, sucrose, starch, etc. Following the impregnation, the oxide material is dried and thereafter is pyrolyzed at a temperature in the range hereinbefore set forth for a predetermined period of time in order to obtain a semiconducting pyropolymeric inorganic refractory oxide material which possesses a resistivity within the range hereinbefore set forth. While the above material describes two specific methods of preparing a semiconducting pyropolymeric inorganic refractory oxide material, it is to be understood that we do not wish to be limited to these methods of preparing said material and that any suitable method in which at least a mono-layer of a carbonaceous material is formed on the surface of a refractory oxide material may also be utilized to form the desired filler.

The semiconducting pyropolymeric inorganic refractory oxide material which is prepared according to one of the processes hereinbefore set forth in the preceding paragraphs and which will possess resistivities in the range of from about 0.001 to about $10^{10}$ ohm-centimeters may be admixed with virtually any polymeric material which can act as a host matrix for the filler. Some specific examples of these polymers which may be both thermosetting or thermoplastic by nature will include polyolefins such as polyethylene and polyethylene copolymers, polypropylene and polypropylene copolymers, polystyrene and copolymers, polyvinylacetate, polyvinyl chloride, vinylacetate-vinyl chloride copolymers, polyvinylidene chloride and copolymers, etc., polyesters, polyurethane, polyphenyl ethers, styrenated polyphenyl ethers, polycarbonates, polyamides, polyimides, polyoxymethylenes, polyalkylene oxides such as polyethylene oxide, polyacrylates, polymetacrylates and their copolymers with styrene, butadiene, acrylonitrile, etc., epoxy resins, acrylonitrile-butadiene-styrene formulations (commonly known as ABS), polybutylene and acrylic-estermodified-styrene-acrylonitrile (ASA), alkyd resins, allyl resins, amino resins, phenolic resins, urea resins, melamine resins, cellulose acetate, cellulose acetate butyrate, cellulose nitrate, cellulose propionate, cellulose triacetate, chlorinated polyethers, chlorinated polyethylene, ethyl cellulose, furan resins, synthetic fibers such as the Nylons, Dacrons, Rayons, terylenes, etc. In addition other matrices which may be used as a host for the semiconducting pyropolymeric inorganic refractory oxide material filler may comprise laminates which are formed by treating a reinforcing material such as canvas, asbestos, glass cloth, cardboard, paper, etc., with a monomer or polymer containing the semiconducting pyropolymeric inorganic refractory oxide material fillers and thereafter forming the desired laminate by conventional means. For example, canvas may be impregnated with such a thermosetting phenolic resin and the resulting composition of matter heated for a predetermined period at an elevated temperature of about 250° to 350° C. to form the desired product. Likewise, asbestos may be treated with vinyl chloride and vinyl acetate dissolved in a solvent which is thereafter allowed to evaporate thus forming the laminate. It is also possible to treat a reinforcing material such as canvas with a mixture of self-catalyzing epoxy resins and allowing the results to set up at room temperature. It is to be understood that the aforementioned polymeric materials are only representative of the class of compounds which may be composited with the fillers to form the novel compositions of matter of the present invention, and that said present invention is not necessarily limited thereto.

The compositions of matter of the present invention may be composited by any method known in the art. The filler material which comprises the semiconducting pyropolymeric inorganic refractory oxide material which possesses the desired resistance is comminuted by milling the material to form particles which possess the desired size, that is, less than 100 microns in size and preferably to form particles less than 1 micron. These particle sizes can be obtained by wet milling the filler material in a volatile solvent medium by means of a roll mill, colloidal mill or ball mill and thereafter flashing off or evaporating the solvent to obtain the dried powder. Examples of suitable solvents which may be employed in the wet milling process will include alcohols, ethers and ketones, etc., such as methyl alcohol, ethyl alcohol, n-propyl alcohol, isopropyl alcohol, acetone, methyl isobutyl ketone, methyl ether, ethyl ether, etc., the evaporation or flashing off step being effected at temperatures ranging up to about 100° C. or more. Following this, the powdered filler in the necessary particle size may then be admixed with a polymeric material of the type hereinbefore set forth, again in any suitable manner, the semiconducting pyropolymeric inorganic refractory oxide filler material usually being present in an amount in the range of from about 95 to about 10% by weight of said filler per weight of the finished composition of matter. One such type of mixing which will permit a thorough and uniform distribution of the filler throughout the body of the polymer is to admix said filler with the polymer in a roll mill, said process being especially effective when the polymer is also in dry form. If so desired, the mixture may be further milled to adjust the particle size of the filler. Following this, a solvent of the type hereinbefore set forth may also be added and the resulting mixture stirred until a uniform consistency has been reached. Thereafter the plastic may then be utilized for the final purpose such as a coating, being poured into a mold whereby the desired form or shape is obtained. When the prepolymeric material is in liquid form such as the case of some epoxy resins, the filler is poured into the liquid and the resulting mixture stirred in order that a uniform distribution of the filler may be obtained throughout the body of the liquid. The resulting composition of matter is then poured into molds or used as a coating which is set by thermal means in the case of thermosetting resins or otherwise cured.

The following examples are given to illustrate the novel compositions of matter which may be prepared according to the process hereinbefore set forth, however, these examples are not intended to limit the generally broad scope of the present invention in strict accordance therewith.

EXAMPLE I

A semiconducting pyropolymeric inorganic refractory oxide material was prepared by pyrolyzing gamma-alumina impregnated with dextrose at a temperature of about 710° C. for a period of about 1.5 hours until a bulk resistivity value of 1500 ohm-centimeters was reached. Following this, the semiconducting pyropolymeric inorganic refractory oxide material was milled with acetone and dried.

The semiconducting pyropolymeric inorganic refractory oxide material prepared according to the above paragraph which possessed a bulk resistivity of 1500 ohm-centimeters and which had a maximum particle size of 10 microns was utilized as a filler in a polymeric material by suspending 1,000 grams of this material in 2 liters of isopropyl alcohol and thereafter admixing this material with 4,000 grams of a thermosetting phenolic resin. This mixture was thoroughly admixed for a period of 15 minutes and thereafter the solution was brushed onto an 8 ounce canvas with a resin percent of about 50%. The resin-soaked canvas was then placed in an oven for 8 minutes at a temperature of 280° F. for an intermediate or B stage, cured and thereafter was followed by hot pressing several such pieces as layers at 325° F. for a period of 45 minutes under an applied pressure of 1,000 pounds per square inch to form a laminate. The resulting semiconducting pyropolymeric inorganic refractory oxide material filled laminate board was found to have a bulk resistivity of 3 megohm-centimeters and was suitable for press cutting into antistatic parts such as washers or gaskets.

EXAMPLE II

A semiconducting pyropolymeric inorganic refractory oxide material was prepared in a manner similar to that set forth in the first paragraph of Example I above by pyrolyzing the dextrose-impregnated gamma-alumina at 950° C. for 2 hours. Following this 600 grams of the filler material which possessed a bulk resistivity of 100 milliohms-centimeters and which had a maximum particle size of 5 microns were dry blended with 100 grams of Union Carbide Bakelite VAGH which is a partially hydrolyzed copolymer of vinyl chloride and vinyl acetate. In addition, 1 liter of a solvent consisting of 69% cellosolve acetate, 21% cyclohexane and 10% xylenes was mixed into the above blend, thus resulting in a formulation with a viscosity of 200 centipoise and fast drying characteristics. The formulation when painted on a surface of an insulator to a thickness of about 100 microns and thoroughly dried at a temperature of 25° C. for a period of 30 minutes will possess a sheet resistivity of 200 ohms per square. Such a formulation is suitable for use as the heating element for a wall panel. For example, a plaster wall containing aluminum foil conductors affixed thereto at a spacing of 16 inches with a film prepared in the above manner covering the entire surface and with a potential difference of 120 volts between the conductors would result in a heated wall of approximately 0.4 watts per square inch of wall surface. This wall could be equilibrated at e.g. a temperature of 150° F. under continuous variable power or could be regulated by means of a thermostat to a comfortable temperature.

EXAMPLE III

In this example a semiconducting pyropolymeric inorganic refractory oxide material is prepared in a manner similar to that set forth in the first paragraph of Example I above by pyrolyzing the dextrose-impregnated gamma-alumina at 860° C. for 1.5 hours. Following this, 100 grams of this material which possessed a bulk resistivity of 50 ohm-centimeters and had a maximum particle size of 1 micron are dry blended with 900 grams of Nylon granules. After thorough mixing, the resulting mixture is heated to extrusion temperatures which are higher than the melting point of the Nylon granules and hydraulically forced through spinnerettes to form a multi-filament yarn which is stretched and wound under tension. An examination of these yarns discloses the fact that individual fibers had diameters of 20 microns and a bulk resistivity of 100 megohm-centimeters. These characteristics would make the Nylon suitable for anti-static uses.

EXAMPLE IV

In this example a semiconducting pyropolymeric inorganic refractory oxide material is prepared by pyrolyzing gamma-alumina in a benzene and nitrogen environment for a period of 1 hour at 700° C. followed by wet milling in an isopropyl alcohol medium and subsequently drying. Following this, 200 grams of the semiconducting pyropolymeric inorganic refractory oxide material which has a bulk resistivity of 900 ohm-centimeters and a maximum particle size of 8 microns are blended with 600 grams of polypropylene pellets at a temperature of 260° C. for a period of 10 minutes in a nitrogen atmosphere until the mixture is homogenous. The polypropylene containing the semiconducting pyropolymeric inorganic refractory oxide material filler is then injection molded and cured to form antistatic parts which possess resistivity values of 70,000 ohm-centimeters.

EXAMPLE V

A semiconducting pyropolymeric inorganic refractory oxide material was prepared by pyrolyzing gamma-alumina in a benzene and nitrogen environment at a temperature of 750° C. for a period of 1 hour followed by heat treatment in a nitrogen atmosphere at a temperature of 930° C. for an additional 0.5 hours. The material was then wet milled in an isopropyl alcohol medium and subsequently dried. Following this, 400 grams of the semiconducting pyropolymeric inorganic refractory oxide material powder which had a bulk resistivity of 10 ohm-centimeters and a maximum particle size of 1 micron were blended with 600 grams of a thermosetting epoxy resin until the mixture was homogenous. The resulting mixture was then poured into molds and cured at a temperature of 140° C. for a period of 3 hours. The resulting polymeric material containing the semiconducting pyropolymeric inorganic refractory oxide material possessed a resistivity value of 10,000 ohm-centimeters.

EXAMPLE VI

To illustrate the aforesaid advantages a series of experiments was performed. Samples for this series of experiments consisted of ½-inch diameter discs made with the semiconducting pyropolymeric inorganic refractory oxide material of the present invention which had been prepared by reacting gamma-alumina with cyclohexane at 600° C. in nitrogen. The reacted material was then ground to a fine powder in a planetary ball mill and pressed into the disc shape under pressure of 30,000 lbs/in$^2$.

The sample discs were each given a heat treatment, after vacuum drying at 160° C. for at least 24 hours, by exposure to temperatures of 700° C. or 900° C. for a period of from ¼ to 4 hours. The importance of the rate of cooling from these temperatures was determined by preparing samples having identical heat treatments except that some were rapidly cooled (5 minutes to ambient) and others were slowly cooled (1 hour to ambient).

Wire electrodes were attached to each side of the heat treated sample discs with an electrically conductive epoxy commonly called "silver dag". To illustrate that it is possible to modify and control the temperature coefficient of resistance of the semiconducting material of the present invention, a sample of the material was placed in a thermostated resistance jig which comprised a glass tube wrapped with heating wires in which an inert atmosphere such as nitrogen may be maintained. A sample was placed in the jig and the wire electrodes were connected to a resistance bridge. The resistance of the sample was taken at an elevated temperature (about 100° C.) and the resistance was also measured at a low temperature (about ambient). The temperature coefficient of resistance (TCR) was computed by the following standard formula:

$$TCR(ppm/°C.) = \frac{1}{R_1} \times \frac{(R_2 - R_1)}{(T_2 - T_1)} \times 10^6$$

In the tests the first two samples did not undergo any heat treatment other than vacuum drying while samples 3 through 10 were treated as set forth in the following table.

TABLE I

| Sample Number | Treatment | R(ohm)25° C. | TCR (%/°C.) |
|---|---|---|---|
| 1 | None | 582,600 | −0.97 |
| 2 | None | 2.56 × 10$^6$ | −1.18 |
| 3 | 15 min 900° C. rapid cool | 30.48 | +1.98 |
| 4 | 1 hour 900° C. rapid cool | 26.21 | +1.13 |
| 5 | 2 hours 900° C. rapid cool | 7.74 | +0.095 |
| 6 | 4 hours 900° C. rapid cool | 6.49 | +2.58 |
| 7 | 1 hour 700° C. rapid cool | 321.4 | +1.16 |
| 8 | 4 hours 700° C. rapid cool | 139.7 | +0.07 |
| 9 | 1 hour 700° C. slow cool | 5,370 | −0.83 |
| 10 | 4 hours 700° C. slow cool | 908 | −1.91 |

The above data clearly demonstrates that the temperature coefficient of resistance of the semiconducting pyropolymeric inorganic refractory oxide material of the present invention can be altered and changed in some instances from negative to positive through appropriate and predetermined thermal treatment of the material. Therefore, by utilizing a predetermined temperature and time of treatment, it is possible to obtain semiconducting material which possesses a desired temperature coefficient of resistance. In contrast to this, the prior art which has been cited against the application, and particularly U.S. Pat. No. 3,571,777 teaches the utility of a device that uses only a normally negative temperature coefficient of resistance but does not teach the use of a conductive filler material which possesses a positive temperature coefficient of resistance, said filler material of the cited reference comprising furnace black.

EXAMPLE VII

To illustrate the difference which exists between the noise index of the semiconducting pyropolymeric inorganic refractory oxide material of the present invention compared to commercial carbon composition resistors, a series of experiments was performed in which pills of the semiconducting pyropolymeric inorganic refractory oxide material of the present invention were prepared in a manner similar to that set forth in the test for the temperature coefficient of resistance. The compressed pills were fitted with electrodes and the electrode leads were attached to the input terminal of a Quan-Tech Model 2136 Resistor Noise Test Set which measures the current noise in accordance with the "Military Standard Test Method for Electronic and Electrical Component Parts, Number 308." The Noise Index (N.I.), which has been defined as the number of microvolts of current noise per volt d.c. voltage in one decade of bandwidth, has been recommended by the National Bureau of Standards as the standard unit for current noise. The "db" equivalent of the Noise Index is given by the following equation:

$$N.I. = 20 \log \frac{\overline{(E_c^2)^{\frac{1}{2}}}}{V} \text{ db (in a decade of frequency)}$$

where $\frac{\overline{(E_c^2)^{\frac{1}{2}}}}{V} = \int \overline{E(f)^2} df =$ total r.m.s. current voltage, $V = $ d.c. voltage, and $\overline{E(f)^2} = $ mean square value of the current noise.

In addition, commercial resistors which contained carbon compositions were also measured. The comparison was made for both the semiconducting pyropolymeric inorganic refractory oxide material of the present invention and the carbon composition resistors which possessed resistance values close to the $10^3$ ohm decade. The resistance values must be comparable inasmuch as the noise of resistors increases with increasing resistance. The results of these tests are shown in Tables 2 and 3 below:

TABLE 2
Current Noise Index of Semiconducting Pyropolymeric Inorganic Refractory Oxide Material Resistor Pellets of the Present Invention

| Test Number | Contacting Metals | Resistance, Ohms | Noise Index (dB) |
|---|---|---|---|
| 1 | In | $5.3 \times 10^3$ | −14 |
| 2 | Au | $1.2 \times 10^4$ | −11 |
| 3 | Au | $6.8 \times 10^3$ | −10 |
| 4 | Au-Pd | $3.2 \times 10^3$ | − 8 |
| 5 | In | $2.5 \times 10^3$ | −17 |
| 6 | Pb | $2.4 \times 10^3$ | −11 |
| 7 | Au | $3.9 \times 10^3$ | −20 |
| Average | | $5.16 \times 10^3$ | −13 dB n=7 |

TABLE 3
Current Noise of Commercial Carbon Composition Resistors

| Test Number | Resistance (Ohms) | Noise Index (dB) |
|---|---|---|
| 1 | $1.26 \times 10^4$ | −5.6 |
| 2 | $1.2 \times 10^3$ | −23.3 |
| 3 | $3.0 \times 10^3$ | −25.2 |
| 4 | $7.0 \times 10^3$ | −21.2 |
| 5 | $2.2 \times 10^3$ | −16 |
| 6 | $3.2 \times 10^3$ | −3.2 |
| 7 | $.85 \times 10^3$ | +6.2 |
| 8 | $.52 \times 10^3$ | +12.1 |
| Average | $3.82 \times 10^3$ | −9.5 dB n=8 |

It will be noted that the average noise index value of the resistors containing the semiconducting pyropolymeric inorganic refractory oxide material of the present invention is different than that of the commercial carbon resistors of relatively similar resistance, the noise values of the former being at least as low as that of the commercial carbon filled devices. The comparison of the tables discloses that the resistors containing the semiconducting pyropolymeric inorganic refractory oxide material of the present invention exhibit an advantage over the commercial carbon filled resistors in that their noise performance possesses a much smaller variance than that of the carbon resistors. At the 95% confidence level, the ratio of true variance, $\sigma$ carbon/$\sigma$ pyropolymer, is greater than 2.61. Therefore, the smaller variance of the product containing the pyropolymer of the present invention implies that there will be many fewer device rejections for a given noise performance specification for those resistors containing the semiconducting pyropolymeric inorganic refractory oxide material of the present invention as compared to the resistors containing the commercial carbon filler.

EXAMPLE VIII

To illustrate the resistance stability of the semiconducting pyropolymeric inorganic refractory oxide material of the present invention, further experiments were performed. The instability of resistor samples can be determined by measuring the ambient temperature resistance of a sample before and after cycling to an elevated temperature followed by computing the percent resistance change. Discs prepared in a manner similar to that hereinbefore set forth were heated to various elevated temperatures, that is, from about 82° up to about 97° C. after having been previously treated at elevated temperatures ranging from 700° C. to 900° C. for periods ranging from ¼ to 4 hours. Sample measurements were made in the resistance jig hereinbefore set forth. The results of these tests are set forth in Table 4 below:

TABLE 4

| Sample | Treatment | Temperature °C. | Resistance (ohms) | TCR (%/°C.) | Resistance Hysteresis |
|---|---|---|---|---|---|
| 1 | 700° C. | 35 | 139.7 | +0.07 | 0.000 |
|  | 4 hours | 82 | 144.9 |  |  |
|  | rapid cool | 35 | 139.7 |  |  |
| 2 | 700° C. | 23 | 5,370 | −0.83 | 0.76 |
|  | 1 hour | 96 | 2,100 |  |  |
|  | slow cool | 23 | 5,411 |  |  |
| 3 | 900° C. | 30 | 6.49 | +2.58 | 2.75 |
|  | 4 hours | 80 | 14.86 |  |  |
|  | rapid cool | 33 | 6.80 |  |  |
|  |  | 30 | 6.31* |  |  |
| 4 | None | 21 | $2.22 \times 10^6$ | −1.18 | 18.1 |
|  |  | 97 | $3.18 \times 10^5$ |  |  |
|  |  | 23 | $2.56 \times 10^6$ |  |  |
|  |  | 21 | $2.62 \times 10^{6*}$ |  |  |

*Value calculated by extrapolation using the TCR

This data demonstrates that an appropriate thermal treatment of semiconducting pyropolymeric inorganic refractory oxide material of the present invention can result in devices which exhibit excellent stability of resistance with respect to thermal cycling. It is to be noted that a heat treated device (sample 1) suffered no change in resistance value (0% hysteresis) after being heated to 82° C. and thereafter cooled to 35° C. Sample 2 shows that a heat treated compressed powder of the present invention when used in a resistor changed only 0.76% in value after being heated to 96° C. and thereafter cooled to 23° C. A further sample (No. 3) exhibited only a 2.75% change, the above samples contrasting to a resistor which had not been subjected to treatment, the latter suffering an 18% change in resistance after thermal cycling to 97° C. and cooling to 21° C. This contrasts to the material disclosed in U.S. Pat. No. 3,563,916 which teaches the preparation of a heat stable carbon black-synthetic resin composition, but does not teach the use of a filler which is itself heat stable.

EXAMPLE IX

As a further illustration of the advantages which may be obtained when using a semiconducting pyropolymeric inorganic refractory oxide material of the present invention as a filler for electrically conductive devices, a series of experiments was performed which demonstrates the highly predictable resistivity of a pyropolymeric material which may be obtained from one batch to another. In one series of experiments, a semi-conducting pyropolymeric material was obtained utilizing gamma-alumina as the substrate and benzene as the pyropolymer precursor. In one batch, the gamma-alumina substrate was heated to a temperature of 917° C. while benzene was passed over the substrate for a period of 1.5 hours. In a second batch run, the benzene was passed over the substrate at a temperature of 915° C. The above method of preparation of the semiconducting pyropolymeric inorganic refractory oxide material was repeated two more times using temperatures of 688° C. and 694° C. respectively. In like manner, a semiconducting pyropolymeric inorganic refractory oxide material was prepared by impregnating gamma-alumina with dextrose followed by drying and subsequent pyrolysis at temperatures ranging from 898° C. to 914° C. The materials from the various batch runs were ground to powders which were less than 100 mesh in a diameter and placed in a high-pressure-resistivity-measurement cell in a hydraulic press, the rams of the press which provided the pressure also acted as electrodes, the leads of which being connected to a resistance bridge. The resistance was taken under a pressure of 50,000 psi at room temperature following which the resistivity, $\rho$, of the various powders was calculated using the formula:

$$\rho \text{ (ohm-cm)} = \frac{\text{Resistance in Ohms} \times \text{Area of Sample in cm}^2}{\text{Height of Sample in cm}}$$

The results from the various batch processes are set forth in Tables 5A and 5B below:

TABLE 5A

| Batch | 1 | 2 | 3 | 4 |
|---|---|---|---|---|
| $C_6H_6/Al_2O_3$, wt. | 0.967 | 0.967 | 5.74 | 5.85 |
| Pyrolysis Conditions | | | | |
| Temperature °C. | 917 | 915 | 688 | 694 |
| Residence time, hours | 1.5 | 1.5 | 4.5 | 4.5 |
| Pressure, psig. | 0 | 0 | 0 | 0 |
| Resistivity, Ω-cm at 25° C. | 0.232 | 0.237 | 0.38 | 0.45 |

TABLE 5B

| Batch | 5 | 6 | 7 | 8 | 9 | 10 | 11 | 12 |
|---|---|---|---|---|---|---|---|---|
| $C_6H_{12}O_6/Al_2O_3$ wt. | 1.429 | → | → | → | → | → | → | → |
| Pyrolysis Conditions | | | | | | | | |
| Temperature °C. | 899 | 898 | 905 | 910 | 914 | 912 | 911 | 914 |
| Residence time, hours | 2.0 | → | → | → | → | → | → | → |
| Pressure, psig | 0 | → | → | → | → | → | → | → |
| Resistivity, Ω-cm at 25° C. | 0.61 | 0.58 | 0.53 | 0.54 | 0.46 | 0.50 | 0.53 | 0.55 |

It is to be noted from the above Table 5A that the resistivity between the pyropolymeric material which was prepared by treating gamma-alumina with benzene at temperatures about 915° C. differed only by 0.005 ohm-centimeters while the resistivity of this type of material which was pyrolyzed at a temperature of about 690° C. differed by only 0.07 ohm-centimeters. Similar reproducible results were obtained when impregnating gamma-alumina with dextrose followed by drying and subsequent pyrolysis at temperatures within a relatively close range, there being only a 0.03 ohm-centimeter difference betweeen batches 5 and 6, a difference of 0.01 ohm-centimeters between batches 8 and 11 while the greatest difference was 0.09 ohm-centimeters between batches 9 and 12.

We claim as our invention:

1. An electrically conductive sheet which comprises at least one layer of a reinforcing material provided with a polymeric matrix material containing from about 10% to about 95% by weight of a finely divided semiconductive filler comprising a refractory inorganic oxide having a carbonaceous pyropolymer composited on the surface thereof, said semiconductive filler having a particle size of from about 0.1 to about 100 microns and a resistivity in the range of from about 0.001 ohm-centimeter to about $10^{10}$ ohm-centimeter.

2. The electrically conductive sheet of claim 1 in which said sheet is heated to effect a B stage cure.

3. The electrically conductive sheet of claim 1 in which said reinforcing material is canvas.

4. The electrically conductive sheet of claim 1 in which said reinforcing material is glass cloth.

5. The electrically conductive sheet of claim 1 in which said reinforcing material is asbestos.

6. The electrically conductive sheet of claim 1 in which said reinforcing material is cardboard.

7. The electrically conductive sheet of claim 1 in which said reinforcing material is paper.

* * * * *